US012762306B2

(12) United States Patent
Joshi et al.

(10) Patent No.: US 12,762,306 B2
(45) Date of Patent: Oct. 13, 2026

(54) CONTROL SYSTEM AND NETWORK CO-DESIGN TOOLCHAIN

(71) Applicant: GM Global Technology Operations LLC, Detroit, MI (US)

(72) Inventors: Prachi Joshi, Ann Arbor, MI (US); Clara Hobbs, Chapel Hill, NC (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 828 days.

(21) Appl. No.: 18/313,692

(22) Filed: May 8, 2023

(65) Prior Publication Data

US 2024/0378339 A1 Nov. 14, 2024

(51) Int. Cl.

| | |
|---|---|
| ***G06F 30/20*** | (2020.01) |
| ***G06F 7/78*** | (2006.01) |
| ***G06F 17/11*** | (2006.01) |
| *G06F 111/10* | (2020.01) |

(52) U.S. Cl.

CPC ................ *G06F 30/20* (2020.01); *G06F 7/78* (2013.01); *G06F 17/11* (2013.01); *G06F 2111/10* (2020.01)

(58) Field of Classification Search

CPC ...... G06F 30/20; G06F 17/11; G06F 2111/10; G06F 30/15

See application file for complete search history.

(56) References Cited

U.S. PATENT DOCUMENTS

| | | | | |
|---|---|---|---|---|
| 2013/0185041 | A1* | 7/2013 | Stander | G06F 30/23 703/8 |
| 2016/0318503 | A1* | 11/2016 | Zhou | B60L 15/007 |
| 2022/0092504 | A1* | 3/2022 | Zhang | G06N 3/126 |
| 2022/0391555 | A1* | 12/2022 | Palm | G06F 30/20 |
| 2024/0120034 | A1* | 4/2024 | Hajnal | G06F 17/11 |
| 2025/0005409 | A1* | 1/2025 | Tokuda | G06Q 50/10 |

OTHER PUBLICATIONS

Kugele et al., "Model-based optimization of automotive E/E-architectures", CSTVA 2014, pp. 18-29 [retrieved from https://dl.acm.org/doi/abs/10.1145/2593735.2593739] (Year: 2014).*

* cited by examiner

*Primary Examiner* — Brian W Wathen

(74) *Attorney, Agent, or Firm* — Vivacqua Crane, PLLC

(57) ABSTRACT

A method for designing electrical/electric architectures includes receiving a system model of an automotive system. The system model includes an initial electrical/electronic architecture. The method further includes receiving control objectives for automotive system and designing, using Pareto optimization, a new electrical/electronic architecture based on the control objectives and the system model.

11 Claims, 1 Drawing Sheet

CONTROL SYSTEM AND NETWORK CO-DESIGN TOOLCHAIN

INTRODUCTION

The present disclosure relates to a control system and network co-design toolchain.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Most automotive system include an electrical/electronic (E/E) architecture. The EE architecture may be constrained by network parameters. It is therefore useful to develop a method and system for designing E/E architectures for automotive systems.

SUMMARY

The present application describes a method for designing an electrical/electronic architecture. The method includes receiving a system model of an automotive system, where the system model includes an initial electrical/electronic architecture; receiving control objectives for automotive system; and designing, using pareto optimization, a new electrical/electronic architecture based on the control objectives and the system model. The method described in this paragraph improves automotive systems by creating an efficient and effective electrical/electronic architecture.

The system model includes a plant model, and the plant model may be expressed using a following equation: $\dot{x}(t)=Ax(t)+Bu(t)$ where: t is time; $\dot{x}(t)$ is a derivative of x(t) with respect to time; x(t) is a vector-valued function representing a state of a plant at time t; u(t) is a vector-valued function representing a control input being applied at time t; a is a state transition matrix; and b is an input matrix. The control objectives include rise time, settling time, and a quadratic function expressed as follows: $J=\int(x^T Qx+u^T Ru)\ dt$:j is a quadratic control cost; q is a cost coefficient matrix for state error; r is a cost coefficient matrix for input error; x is the state of the plant; u is the control input; and t is the time. Designing the new electrical/electronic architecture includes generating a plurality of prospective software controllers for the plant model, where each of the prospective software controller includes a sampling rate and a feedback gain value. Designing the new electrical/electronic architecture includes exploring combinations of the plurality of prospective software controllers to control the plant model and network (Ethernet) parameters using the pareto optimization, where the network parameters include packet priority, transmission delay, and buffer sizes. Designing the new electrical/electronic architecture includes generating a Pareto front of selected software controllers and selected Ethernet network parameters as a result of exploring the combinations of the plurality of prospective software controllers. Designing the new electrical/electronic architecture includes using the pareto front of selected software controllers and selected Ethernet network parameters to design the new electrical/electronic architecture.

The present disclosure also describes a tangible, non-transitory, machine-readable medium, comprising machine-readable instructions, that when executed by a processor, cause the processor to execute the method described above. The present disclosure also describes a system including a controller. The controller is programed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
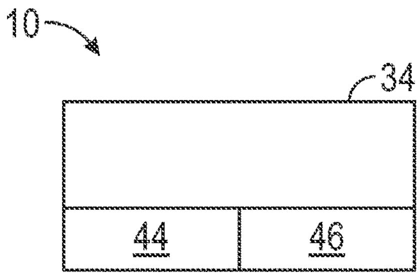
FIG. 1 is a block diagram depicting an embodiment of a system for designing electrical/electronic architectures.

Reference will now be made in detail to several examples of the disclosure that are illustrated in accompanying drawings. Whenever possible, the same or similar reference numerals are used in the drawings and the description to refer to the same or like parts or steps.

FIG. 1 shows a system or toolchain 10 for designing electrical/electric (E/E) architectures. The system 10 includes a controller or computing device 34 including at least one processor 44 and a non-transitory computer readable storage device or media 46. The processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The controller 34 of the vehicle 10 may be referred to as a vehicle controller and may be programmed to execute a method 100 (FIG. 2) as described in detail below.

The instructions may include one or more separate programs, each of which comprises an ordered listing of executable instructions for implementing logical functions. The instructions, when executed by the processor 44, perform logic, calculations, methods and/or algorithms. Although a single controller 34 is shown in FIG. 1, embodiments of the vehicle 10 may include a plurality of controllers 34 that communicate over a suitable communication medium or a combination of communication mediums and that cooperate to process the sensor signals, perform logic, calculations, methods, and/or algorithms, and generate control signals.

The toolchain 10 automates the co-design of control systems and the underlying Ethernet network architecture, while minimally disrupting existing workflows. The toolchain 10 integrates with other design tools to create abstract specifications. Then, the toolchain 10 solves a co-optimization problem to create controllers, processor schedules and Ethernet network parameter(s) configurations to optimally implement a system design. The toolchain 10 is an automated approach to explore efficient designs, giving engineers a broader choice of implementations than is currently possible. The use of the toolchain 10 will require less human effort than in our current processes.

Figure 2:
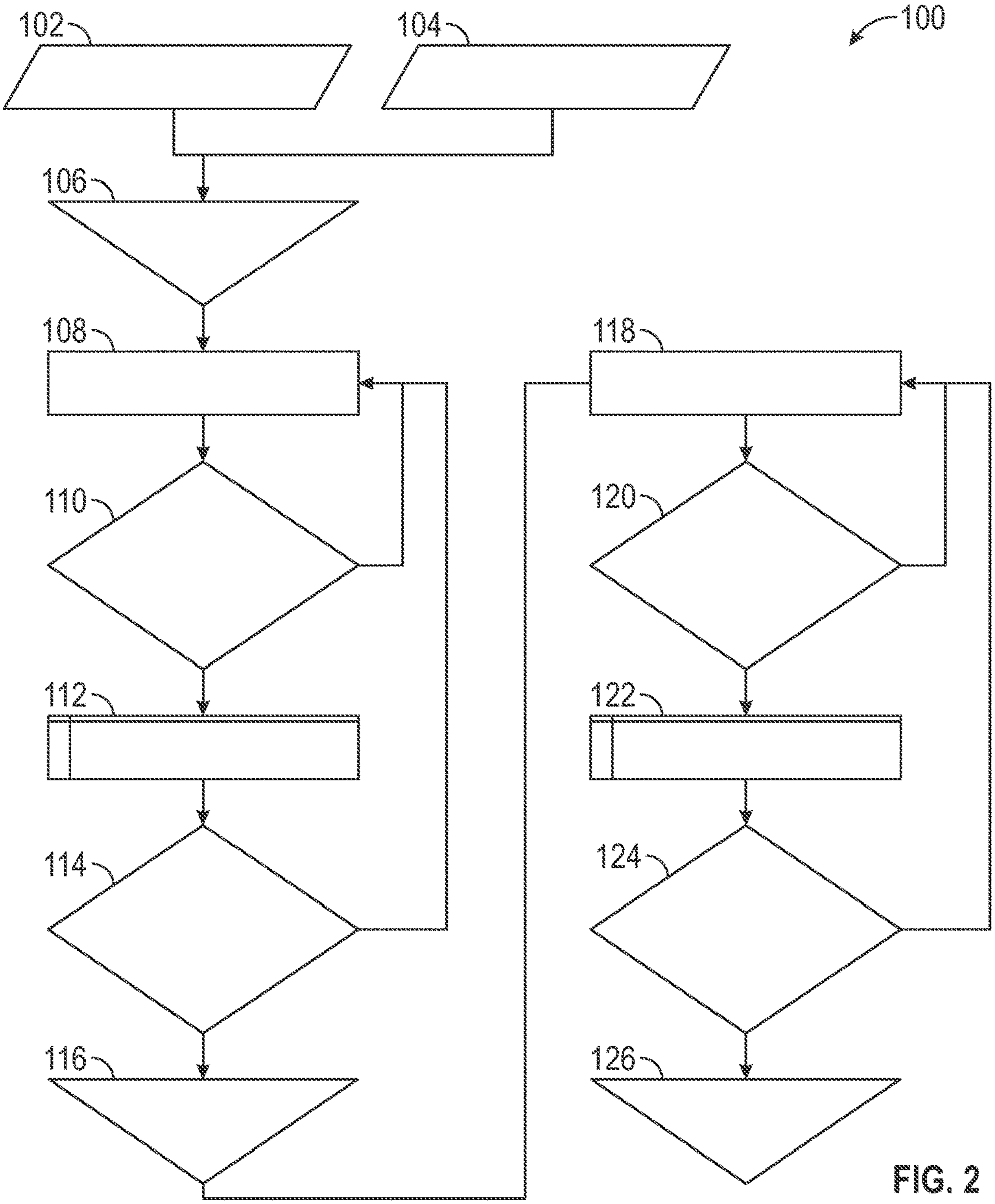
FIG. 2 is a flowchart for designing electrical/electronic architectures.

FIG. 2 is a flowchart of a method 100 for designing (E/E) architectures. Some controllers are designed without accounting for the implementation of architecture. This results in a model/implementation disconnect that is resolved in an iterative process using X-in-the loop simulation and debugging. As automotive E/E architectures are constantly evolving, this procedure is also becoming more costly. It is therefore desirable to address this issue by developing a toolchain that uses controller parameters and their associated implementation parameters (e.g., task mapping and scheduling) to co-design and automatically synthesized the automotive E/E architecture. This will potentially cut down design and debugging efforts and allow easier transition to E/E architectures.

The method 100 begins at block 102 and block 104. At block 102, the controller 34 receives the system model of an automotive system. The system model may be a model of a physical, tangible automotive system, such as a propulsion system (e.g., electric motor) or a steering system of a vehicle. As a non-limiting example, the plant model may be in the form of linear differential equations. For example, the plant model may be expressed using the following equation:

$$\dot{x}(t) = Ax(t) + Bu(t) \qquad \text{Eq. 1}$$

where:

t is time;

$\dot{x}(t)$ is the derivative of x(t) with respect to time;

x(t) is a vector-valued function representing the state of the plant (i.e., physical system) at time t;

u(t) is a vector-valued function representing the control input being applied at time t;

A is a state transition matrix; and

B is an input matrix.

The system model may include a plant model, the layout of an initial E/E architecture, and a layout of hardware connections. The layout of the initial E/E architecture includes Ethernet network parameters with constraints and microprocessors where software tasks for a control system will be executed. From abstract models, the toolchain produces real-time tasks models for sensing, control, and actuation tasks on all relevant processors, along with Ethernet network parameters and prospective mapping of tasks to processors.

At block 104, the controller 34 receives the control objectives for the automotive system (e.g., the propulsion system or the steering system of a vehicle). The control objectives may include rise time, settling time, and a quadratic function expressed as follows:

$$J = \int (x^T Qx + u^T Ru)dt$$

J is a quadratic control cost;

Q is a cost coefficient matrix for state error;

R is a cost coefficient matrix for input error;

x is the state of the plant (i.e., physical system);

u is the control input; and t is time;

Then, the method 100 continues to block 106. At block 106, the controller 34 stores the system description, which includes the system model and the control objectives. Then, the method 100 continues to block 110.

At block 108, the controller (e.g., computing device) 34 uses Pareto optimization (i.e., multi-objective optimization) to design one or more software architectures (e.g., software controllers) for the physical system based on the system description. First, the controller 34 generates a set of prospective controllers for each plant model, including sampling rates and feedback gain values. Second, the controller 34 explores combinations of prospective controllers to control all plants, along with Ethernet network parameters including packet priority, transmission delay, and buffer sizes. Then, the method 100 continues to block 110. At block 110, the controller 34 determines whether the software controller (e.g., software architecture) meets the control objectives. If the software controller does not meet the control objectives, then the method 100 returns to block 108. If the software controller meets the control objectives, then the method 100 continues to block 112.

At block 112, the controller 34 updates the Pareto front. Then, the method 100 continues to block 114. At block 114, the controller 34 determines whether more software controllers should be tested. If more software controllers should be tested, then the method 100 returns to block 108. If no more software controllers need to be tested, then the method 100 proceeds to block 116. At block 116, the controller 34 stores the updated Pareto front. Then, the method 100 continues to block 118.

At block 118, the controller (e.g., computing device) 34 designs another software architecture (e.g., software controller) for the physical system based on the system description. As discussed above, the system description includes system model and control objectives. The controller 34 may use Pareto optimization (i.e., multi-objective optimization) to design the software controller. Then, the method 100 continues to block 120. At block 120, the controller 34 determines whether the software controller (e.g., software architecture) meets the control objectives (i.e., is feasible). If the software controller does not meet the control objectives, then the method 100 returns to block 118. If the software controller meets the control objectives, then the method 100 continues to block 122.

At block 122, the controller 34 updates the Pareto front. Then, the method 100 continues to block 124. At block 124, the controller 34 determines whether more design combinations should be tested. If more design combinations should be tested, then the method 100 returns to block 108. If no more design combinations need to be tested, then the method 100 proceeds to block 126. At block 126, the controller 34 stores the updated Pareto front. In other words, at block 126, the controller 34 returns a Pareto front of controllers and related Ethernet network parameters over the space of control objectives and network utilization. The controller 34 then selects a design solution and completes the controller designs and Ethernet network parameter configurations, which include partial network specification, using the Pareto front of selected software controllers and related Ethernet network parameters. Thus, the controller 34 designs a new E/E architecture for an automotive system using the Pareto front of selected software controllers and related Ethernet network parameters.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for designing an electrical/electronic architecture, comprising:

receiving a system model of an automotive system, wherein the system model includes an initial electrical/electronic architecture;

receiving control objectives for automotive system; and designing, using Pareto optimization, a new electrical/electronic architecture for the automotive system based on the control objectives and the system model, wherein the system model includes a plant model, and the plant model may be expressed using a following equation:

$$\dot{x}(t) = Ax(t) + Bu(t)$$

where:

t is time;

$\dot{x}(t)$ is a derivative of x(t) with respect to time;

x(t) is a vector-valued function representing a state of a plant at time t;

u(t) is a vector-valued function representing a control input being applied at time t;

A is a state transition matrix; and

B is an input matrix, wherein the control objectives include rise time, settling time, and a quadratic function expressed as follows:

$$J = \int \left(x^T Qx + u^T Ru\right)dt$$

J is a quadratic control cost;

Q is a cost coefficient matrix for state error;

R is a cost coefficient matrix for input error;

x is the state of the plant;
u is the control input; and
t is the time, and wherein designing the new electrical/electronic architecture includes generating a plurality of prospective software controllers for the plant model, wherein each of the prospective software controllers includes a sampling rate and a feedback gain value.

2. The method of claim 1, wherein designing the new electrical/electronic architecture includes exploring combinations of the plurality of prospective software controllers to control the plant model and Ethernet network parameters using the Pareto optimization, wherein the Ethernet network parameters include packet priority, transmission delay, and buffer sizes.

3. The method of claim 2, wherein designing the new electrical/electronic architecture includes generating a Pareto front of selected software controllers and selected Ethernet network parameters as a result of exploring the combinations of the plurality of prospective software controllers.

4. The method of claim 3, wherein designing the new electrical/electronic architecture includes using the Pareto front of selected software controllers and selected Ethernet network parameters to design the new electrical/electronic architecture.

5. A tangible, non-transitory, machine-readable medium, comprising machine-readable instructions, that when executed by a processor, cause the processor to:

receive a system model of an automotive system, wherein the system model includes an initial electrical/electronic architecture;

receive control objectives for automotive system; and design, using Pareto optimization, a new electrical/electronic architecture for the automotive system based on the control objectives and the system model, wherein the system model includes a plant model, and the plant model may be expressed using a following equation:

$$\dot{x}(t) = Ax(t) + Bu(t)$$

where:
t is time;
$\dot{x}(t)$ is a derivative of x(t) with respect to time;
x(t) is a vector-valued function representing a state of a plant at time t;
u(t) is a vector-valued function representing a control input being applied at time t;
A is a state transition matrix; and
B is an input matrix, wherein the control objectives include rise time, settling time, and a quadratic function expressed as follows:

$$J = \int (x^T Qx + u^T Ru)dt$$

J is a quadratic control cost;
Q is a cost coefficient matrix for state error;
R is a cost coefficient matrix for input error;
x is the state of the plant;
u is the control input; and
t is the time, and wherein designing the new electrical/electronic architecture includes generating a plurality of prospective software controllers for the plant model, wherein each of the prospective software controllers includes a sampling rate and a feedback gain value.

6. The tangible, non-transitory, machine-readable medium of claim 5, wherein the tangible, non-transitory, machine-readable medium, further comprising machine-readable instructions, that when executed by the processor, causes the processor to:

explore combinations of the plurality of prospective software controllers to control the plant model and Ethernet network parameters using the Pareto optimization, wherein the Ethernet network parameters include packet priority, transmission delay, and buffer sizes.

7. The tangible, non-transitory, machine-readable medium of claim 6, wherein the tangible, non-transitory, machine-readable medium, further comprising machine-readable instructions, that when executed by the processor, causes the processor to:

generate a Pareto front of selected software controllers and selected Ethernet network parameters as a result of exploring the combinations of the plurality of prospective software controllers.

8. The tangible, non-transitory, machine-readable medium of claim 7, wherein the tangible, non-transitory, machine-readable medium, further comprising machine-readable instructions, that when executed by the processor, causes the processor to:

use the Pareto front of selected software controllers and selected Ethernet network parameters to design the new electrical/electronic architecture.

9. A system for designing an electrical/electronic architecture, comprising:

a controller programmed to:

receive a system model of an automotive system, wherein the system model includes an initial electrical/electronic architecture;

receive control objectives for automotive system; and design, using Pareto optimization, a new electrical/electronic architecture for the automotive system based on the control objectives and the system model, wherein the system model includes a plant model, and the plant model may be expressed using a following equation:

$$\dot{x}(t) = Ax(t) + Bu(t)$$

where:
t is time;
$\dot{x}(t)$ is a derivative of x(t) with respect to time;
x(t) is a vector-valued function representing a state of a plant at time t;
u(t) is a vector-valued function representing a control input being applied at time t;
A is a state transition matrix; and
B is an input matrix, wherein the control objectives include rise time, settling time, and a quadratic function expressed as follows:

$$J = \int (x^T Qx + u^T Ru)dt$$

J is a quadratic control cost;

Q is a cost coefficient matrix for state error;

R is a cost coefficient matrix for input error;

x is the state of the plant;

u is the control input; and t is the time, and wherein designing the new electrical/electronic architecture includes generating a plurality of prospective software controllers for the plant model, wherein each of the prospective software controllers includes a sampling rate and a feedback gain value.

10. The system of claim 5, wherein the controller is programmed to:

explore combinations of the plurality of prospective software controllers to control the plant model and Ethernet network parameters using the Pareto optimization to generate a generate a Pareto front of selected software controllers and selected Ethernet network parameters, wherein the Ethernet network parameters include packet priority, transmission delay, and buffer sizes.

11. The system of claim 10, wherein controller is programmed to:

use the Pareto front of selected software controllers and selected Ethernet network parameters to design the new electrical/electronic architecture.

* * * * *